US008121728B2

(12) United States Patent
Chiang et al.

(10) Patent No.: US 8,121,728 B2
(45) Date of Patent: Feb. 21, 2012

(54) ROBOT APPARATUS AND OUTPUT CONTROL METHOD THEREOF

(75) Inventors: Tsu-Li Chiang, Guangdong (CN); Xiao-Guang Li, Guangdong (CN); Han-Che Wang, Guangdong (CN); Hua-Dong Cheng, Guangdong (CN); Kuan-Hong Hsieh, Guangdong (CN); Li Wang, Guangdong (CN)

(73) Assignees: Hong Fu Jin Precision Industry (Shen Zhen) Co., Ltd., Longhua Town, Bao'an District, Shenzhen, Guangdong Province (CN); Hon Hai Precision Industry Co., Ltd., Tucheng Dist., New Taipei (TW)

( * ) Notice: Subject to any disclaimer, the term of this patent is extended or adjusted under 35 U.S.C. 154(b) by 929 days.

(21) Appl. No.: 12/134,220

(22) Filed: Jun. 6, 2008

(65) Prior Publication Data

US 2008/0306629 A1 Dec. 11, 2008

(30) Foreign Application Priority Data

Jun. 8, 2007 (CN) .......................... 2007 1 0074768

(51) Int. Cl.
*B25J 13/00* (2006.01)

(52) U.S. Cl. ......... 700/245; 901/46; 901/1; 318/568.12; 318/568.16

(58) Field of Classification Search .................. 700/245, 700/249; 901/46, 1; 318/568.16, 568.12; 340/539.13
See application file for complete search history.

(56) References Cited

U.S. PATENT DOCUMENTS

| | | | | |
|---|---|---|---|---|
| 6,429,016 | B1 * | 8/2002 | McNeil | 436/47 |
| 7,099,745 | B2 * | 8/2006 | Ebert | 700/245 |
| 7,228,203 | B2 * | 6/2007 | Koselka et al. | 700/245 |
| 7,245,216 | B2 * | 7/2007 | Burkley et al. | 340/539.13 |
| 7,456,596 | B2 * | 11/2008 | Goodall et al. | 318/568.12 |
| 7,720,572 | B2 * | 5/2010 | Ziegler et al. | 700/245 |
| 7,739,534 | B2 * | 6/2010 | Cheng et al. | 713/324 |
| 7,814,355 | B2 * | 10/2010 | Cheng et al. | 713/324 |
| 7,873,913 | B2 * | 1/2011 | Lian et al. | 715/786 |
| 7,932,809 | B2 * | 4/2011 | Nair et al. | 340/5.2 |
| 7,949,899 | B2 * | 5/2011 | Chen et al. | 714/25 |
| 7,996,111 | B2 * | 8/2011 | Cheng et al. | 700/249 |
| 8,001,426 | B2 * | 8/2011 | Cheng et al. | 714/44 |
| 8,065,622 | B2 * | 11/2011 | Li et al. | 715/764 |
| 2002/0011367 | A1 * | 1/2002 | Kolesnik | 180/168 |
| 2002/0060542 | A1 * | 5/2002 | Song et al. | 318/568.12 |
| 2003/0025472 | A1 * | 2/2003 | Jones et al. | 318/568.12 |
| 2003/0176986 | A1 * | 9/2003 | Dietsch et al. | 702/150 |

(Continued)

FOREIGN PATENT DOCUMENTS

| | | |
|---|---|---|
| JP | 2004160630 | 6/2004 |

(Continued)

*Primary Examiner* — Thomas Black
*Assistant Examiner* — Wae Louie
(74) *Attorney, Agent, or Firm* — Winston Hsu; Scott Margo

(57) ABSTRACT

The present invention relates to a robot apparatus and an output control method adapted for the robot apparatus. The method includes steps of: receiving radio frequency (RF) signals of identification (ID) codes from several wireless communication devices within a predetermined area and time period; sensing people and obtaining the number of people within the predetermined area and time period; comparing current ID codes and the number of people in the predetermined area with what were determined previously, generating an update signal when the comparison is not equal; replacing the previous data with the current data; acquiring output data based on the associated output found in the output table; and performing an output based on the output data.

18 Claims, 5 Drawing Sheets

U.S. PATENT DOCUMENTS

| | | | | |
|---|---|---|---|---|
| 2004/0134337 | A1* | 7/2004 | Solomon | 89/1.11 |
| 2004/0207355 | A1* | 10/2004 | Jones et al. | 318/568.12 |
| 2004/0211444 | A1* | 10/2004 | Taylor et al. | 134/18 |
| 2005/0000543 | A1* | 1/2005 | Taylor et al. | 134/18 |
| 2008/0167751 | A1* | 7/2008 | Cheng et al. | 700/249 |
| 2008/0177421 | A1* | 7/2008 | Cheng et al. | 700/245 |
| 2008/0306629 | A1* | 12/2008 | Chiang et al. | 700/245 |
| 2008/0306741 | A1* | 12/2008 | Wang et al. | 704/275 |
| 2009/0063155 | A1* | 3/2009 | Chiang et al. | 704/261 |
| 2009/0083039 | A1* | 3/2009 | Chiang et al. | 704/275 |
| 2009/0132250 | A1* | 5/2009 | Chiang et al. | 704/251 |

FOREIGN PATENT DOCUMENTS

| | | | |
|---|---|---|---|
| JP | 2004160630 A | * | 6/2004 |
| TW | M269107 | | 7/2005 |

* cited by examiner

| No. | Previous data | Current data | Output data | | | |
|---|---|---|---|---|---|---|
| | | | Light data | Sound data | Communication data | Action data |
| 1 | Two communicated ID codes of R1 and R3 and two sensed persons | Three communicated ID codes and three sensed persons | Slowly flashing blue light | "Mother is back" | -- | Raise head and walk towards R2 (Mother) |
| 2 | Three communicated ID codes and three sensed persons | Three communicated ID codes and five sensed persons | Slowly flashing yellow light | "Guests come" | -- | Walk towards the guests, tail swinging |
| 3 | Nothing communicated and nobody sensed | Nothing communicated and one sensed person | Quickly flashing red light | Warning voice | "A stranger is in the room" | Face the stranger and retreat |
| 4 | Three communicated ID codes and three sensed persons | Two communicated ID codes of R1 and R2 and two sensed persons | Quickly flashing green light | "The child goes out" | -- | Shake head |
| ... | ... | ... | ... | ... | ... | ... |

FIG. 4

ROBOT APPARATUS AND OUTPUT CONTROL METHOD THEREOF

TECHNICAL FIELD

The present invention relates to robots, and more particularly, to a robot apparatus and an output control method adapted for the robot apparatus.

GENERAL BACKGROUND

There are many robotic designs in the market today. Robots may be designed to perform tedious manufacturing tasks or for entertainment. There are also some robots designed for use in home settings. Family robots are equipped with all kinds of external sensors, such as a microphone, a charge-coupled device (CCD) camera, and the like. A family robot can be programmed to respond in some manner when it recognizes the voice or appearance of a family member using voice recognition and/or image recognition software. However, it is a very complex procedure for a robot to analyze external stimulus using such software and mistakes are common. As a result, the family robot may perform a wrong output.

Accordingly, what is needed in the art is a robot system that overcomes the deficiencies of the prior art.

SUMMARY

A robot system is provided. The robot system includes a robot apparatus and several wireless communication devices. The wireless communication devices are configured to send radio frequency (RF) signals of identification (ID) codes. The robot apparatus includes a communicating unit, a sensing unit, a buffer unit, a storage unit, a processing unit, and an output unit. The communicating unit is for receiving the RF signals of ID codes from the wireless communication devices within a predetermined area and time period. The sensing unit is for sensing people and obtaining the number of people within the predetermined area and time period. The buffer unit is for storing previous and current condition data, wherein the previous data, which is initialized to null, comprise ID codes and the number of people updated and stored at a previous time, and the current data include current ID codes and the number of people in the predetermined area as determined by the communicating unit and the sensing unit. The storage unit is for storing an output table, which respectively associates a plurality of outputs with various combinations and/or changes in the ID codes and the number of people in the predetermined area.

The processing unit includes an ID presence determining (IDPD) module, an updating module, and an output decision module. The IDPD module is for comparing the current ID codes and the number of people with previous data stored previously in the buffer unit, and generating an update signal when the comparison is not equal. The updating module is for replacing the previous data with the current data based on the update signal. The output decision module is configured for acquiring output data in the storage unit associated with any differences between previous data and current data in the output table. The output unit is for performing an output according to the output data.

Other advantages and novel features will be drawn from the following detailed description with reference to the attached drawings.

BRIEF DESCRIPTION OF THE DRAWINGS

The components in the drawings are not necessarily drawn to scale, the emphasis instead being placed upon clearly illustrating the principles of a robot system. Moreover, in the drawings, like reference numerals designate corresponding parts throughout the several views.

FIG. 4 is a schematic diagram illustrating an output table of the robot of FIG. 1.

DETAILED DESCRIPTION OF THE EMBODIMENTS

Figure 1:
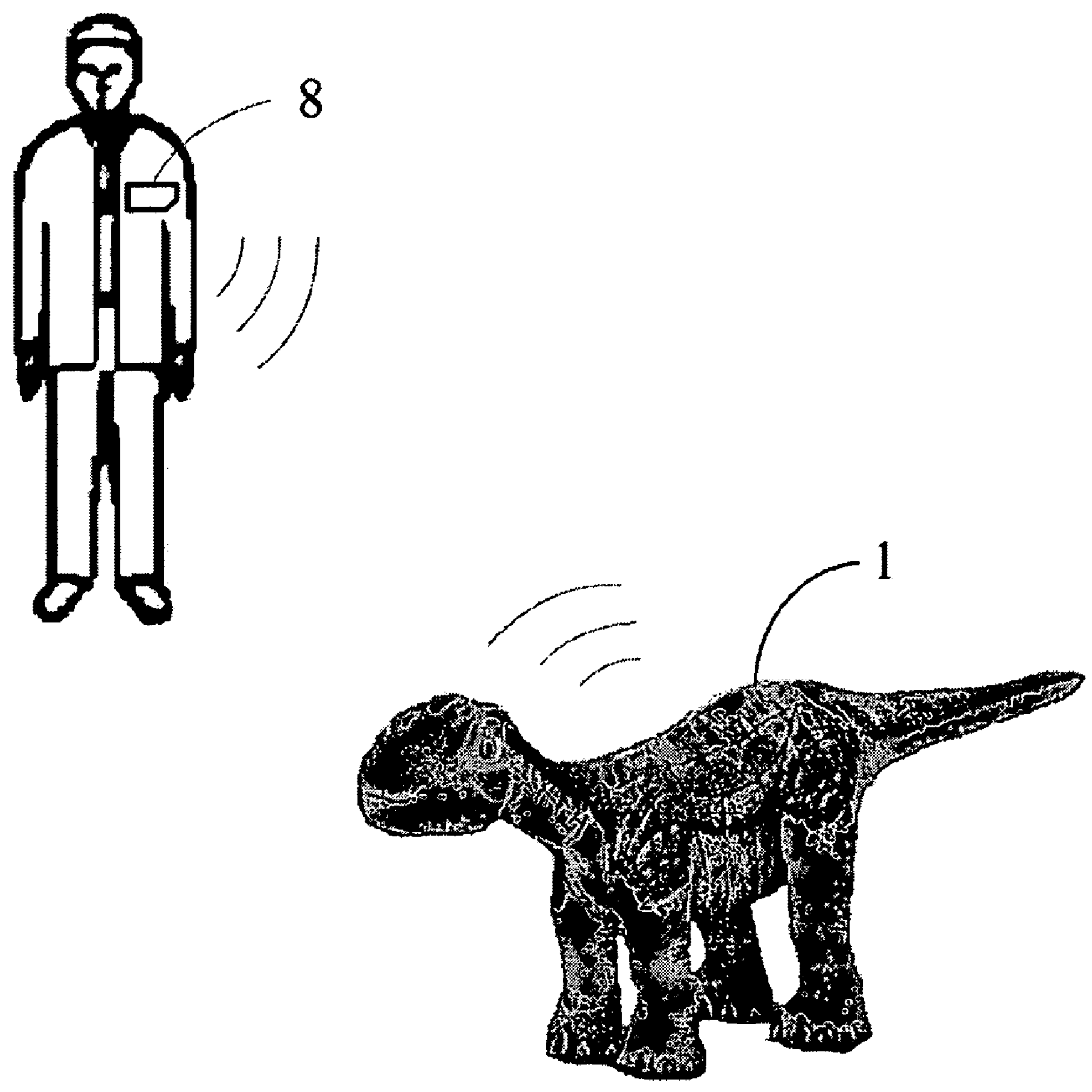
FIG. 1 is a schematic diagram of a robot system in accordance with an exemplary embodiment of the present invention.

FIG. 1 is a schematic diagram of a robot system in accordance with an exemplary embodiment of the present invention. The robot system includes a robot 1 and at least one radio frequency identification (RFID) card 8. The RFID card 8 is configured for sending RF signals of an ID code to the robot 1. In other embodiments, the RFID card 8 can be replaced by other wireless communication device, such as a mobile phone, a personal digital assistant (PDA), and the like. In this embodiment the robot 1 is represented as a dinosaur, however, the robot may be other representations. In the exemplary embodiment there are three RFID cards 8 correspondingly possessed by three members of a family, that is, a father, a mother, and a child. For convenient description, serial numbers of the RFID cards 8 are assigned as follows: the father=R1, the mother=R2, and the child=R3. In other embodiments, The RFID card 8 may be attached to animals or objects, not just people.

Figure 2:
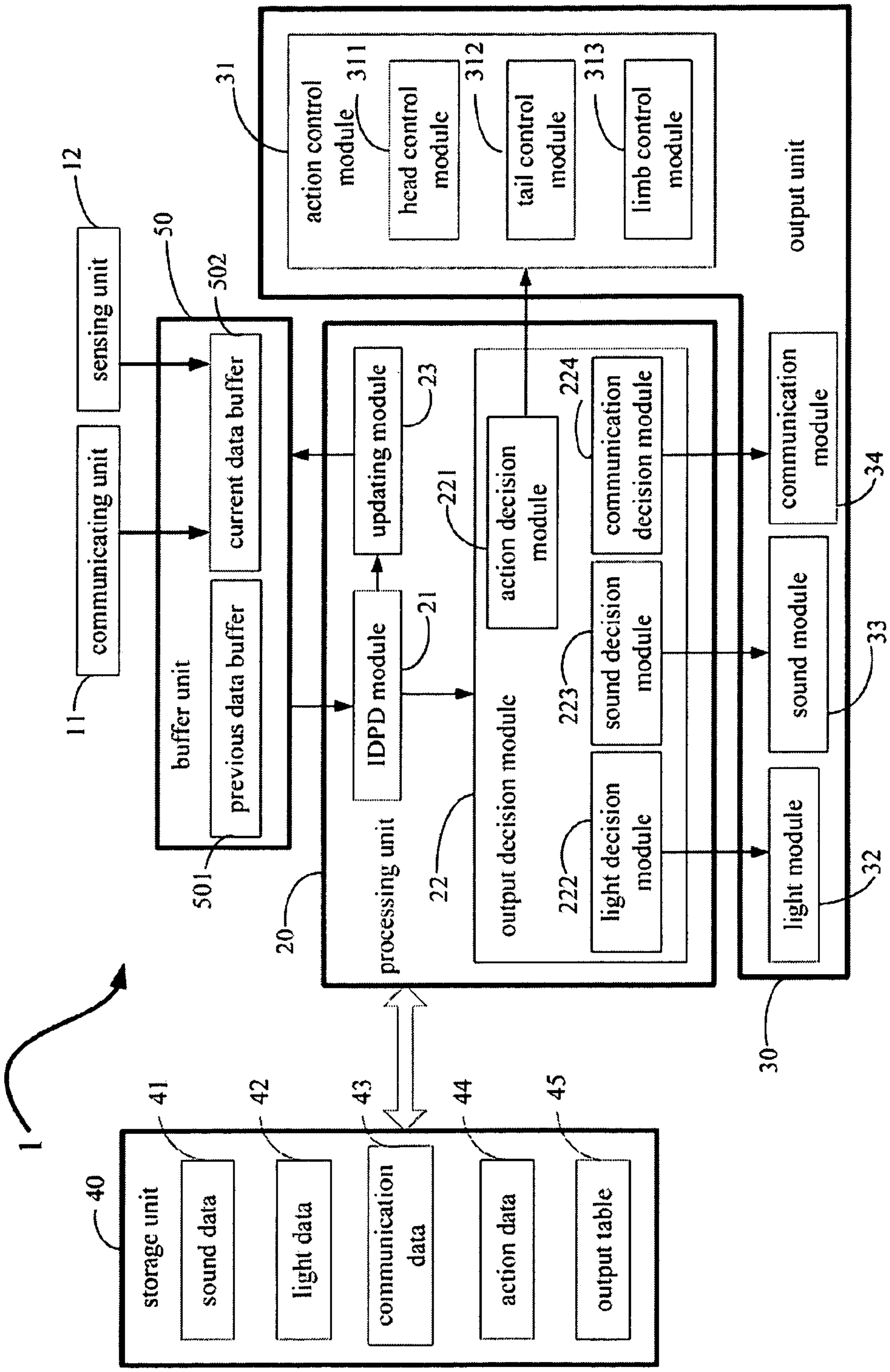
FIG. 2 is a block diagram showing a hardware infrastructure of the robot of FIG. 1.

FIG. 2 is a block diagram showing the hardware infrastructure of the robot 1. The robot 1 includes a communicating unit 11, a sensing unit 12, a processing unit 20, an output unit 30, a storage unit 40, and a buffer unit 50. The storage unit 40 is configured for storing sound data 41, light data 42, communication data 43, action data 44, and an output table 45.

The communicating unit 11 is configured for receiving RF signals of ID codes from the RFID cards 8 within a predetermined area and time period. The sensing unit 12 is configured for sensing people and obtaining the number of people within the predetermined area and time period. The sensing unit 12 can be configured at any predetermined position on the robot 1. The sensing unit 12 may be a microphone to pick up ambient sound in the predetermined area, a charge-coupled device (CCD) camera to capture images of people in the predetermined area, or other sensing unit, such as an infrared sensing unit, an ultrasonic sensing unit, and the like.

The buffer unit 50 includes a previous data buffer 501 and a current data buffer 502. The current data buffer 502 stores current RF and sensory data of the robot 1. The current RF and sensory data include the ID codes received by the communicating unit 11, and the number of people sensed by the sensing unit 12. The previous data buffer 501 stores same kinds of previously recorded data. By default, the previous data is initialized to null. When the current data does not match the previous data, the processing unit 20 replaces the previous data with the current data. When the previous data and the current data are the same, no update to the previous data takes place in the previous data buffer 501.

The processing unit 20 includes an ID presence determining (IDPD) module 21, an output decision module 22, and an updating module 23. The IDPD module 21 is configured for comparing current ID codes and the number of people in the predetermined area in the current data buffer 502 with what were determined previously in the previous data buffer 501, and generating an update signal when the comparison is not equal.

Figure 3:
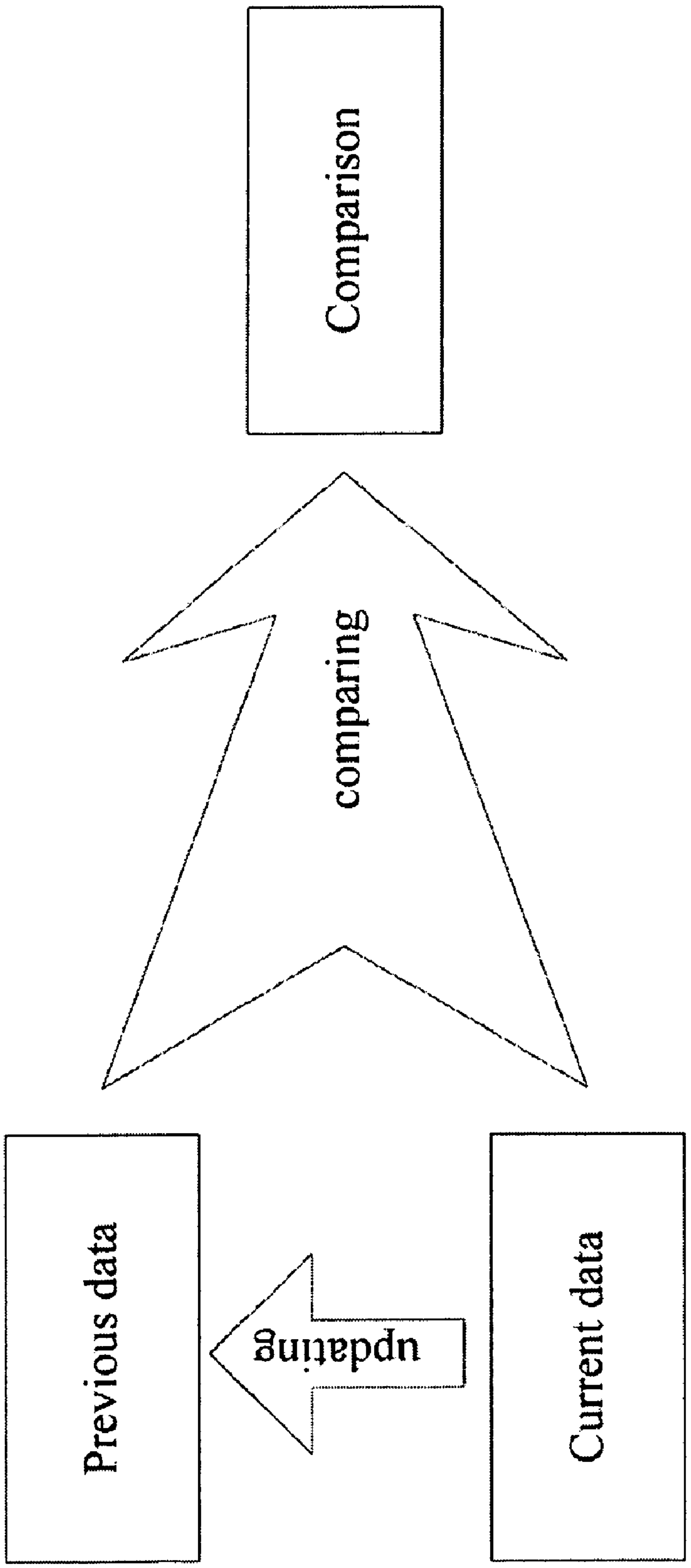
FIG. 3 is a schematic diagram illustrating comparing and updating data.

FIG. 3 is a block diagram illustrating comparing and updating data. The IDPD module 21 is further configured for judging whether the comparison is equal. When the comparison is not equal, that is, the current data does not match the previous data, the IDPD module 21 generates the update signal. The updating module 23 is configured for replacing the previous data in the previous data buffer 501 with the current data in the current data buffer 502 according to the update signal.

The output decision module 22, electrically coupled to the IDPD module 21, includes an action decision module 221, a light decision module 222, a sound decision module 223, and a communication decision module 224. The output decision module 22 is configured for acquiring output data (i.e. the sound data 41, the light data 42, the communication data 43, and the action data 44) in the storage unit 40 associated with any differences between previous data and current data in the output table 45 and controlling the output unit 30 to perform an output.

The output unit 30 includes an action control module 31, a light module 32, a sound module 33, and a communication module 34. The light module 32, electrically coupled to the light decision module 222, is configured for emitting light. The sound module 33, electrically coupled to the sound decision module 223, is configured for outputting voice warning. The communication module 34, electrically coupled to the communication decision module 224, is configured for providing a communicative output. The communication module 34 may communicate with an external communication apparatus (not shown) and send the communicative output to the external communication apparatus. The action control module 31, electrically coupled to the action decision module 221, is configured for performing actions. The action control module 31 includes a head control module 311 for controlling the head of the robot 1, a tail control module 312 for controlling a tail of the robot 1, and a limb control module 313 for controlling limbs of the robot 1.

FIG. 4 is a schematic diagram illustrating an example of the output table 45, listing outputs of the robot 1 of FIG. 1. The output table 45 respectively associates a plurality of outputs with various combinations and/or changes in the ID codes and the number of people in the predetermined area. The output table 45 includes a previous data column, a current data column, and an output data column. The output data column includes a light data sub-column, a sound data sub-column, a communication data sub-column, and an action data sub-column.

Taking row No. 1 for example, when the previous data are "two communicated ID codes of R1 and R3 and two sensed persons" and the current data are "three communicated ID codes and three sensed persons", the processing unit 20 controls the output unit 30 to perform corresponding output according to the previous data and the current data, that is, for example, the light decision module 222 controls the light module 32 to emit a slowly flashing blue light, the sound decision module 223 controls the sound module 33 to output voice warning "mother is back", and the head control module 311 controls the robot 1 to raise its head and the limb control module 313 controls the robot 1 to walk towards R2 (mother).

When the previous data are "three communicated ID codes and three sensed persons" and the current data are "three communicated ID codes and five sensed persons", as shown in row No. 2, the processing unit 20 controls the output unit 30 to perform corresponding output according to the previous data and the current data, that is, for example, the light decision module 222 controls the light module 32 to emit a slowly flashing yellow light, the sound decision module 223 controls the sound module 33 to output voice warning "guests come", and the limb control module 313 controls the robot 1 to walk towards the guests and the tail control module 312 controls the robot 1 to swing the tail.

As shown in row No. 3, when the previous data are "nothing communicated and nobody sensed" and the current data are "nothing communicated and one sensed person", the processing unit 20 controls the output unit 30 to perform corresponding output according to the previous data and the current data, that is, for example, the light decision module 222 controls the light module 32 to emit a quickly flashing red light, the sound decision module 223 controls the sound module 33 to output warning voice, the communication decision module 224 controls the communication module 34 to send out the communication data of "a stranger is in the room", and the head control module 311 controls the robot 1 to face the stranger and the limb control module 313 controls the robot 1 to retreat.

When the previous data are "three communicated ID codes and three sensed persons" and the current data are "two communicated ID codes of R1 and R2 and two sensed persons", as shown in row No. 4, the processing unit 20 controls the output unit 30 to perform corresponding output according to the previous data and the current data, that is, for example, the light decision module 222 controls the light module 32 to emit a slowly flashing green light, the sound decision module 223 controls the sound module 33 to output voice warning "the child goes out", and the head control module 311 controls the robot 1 to shake the head.

Figure 5:
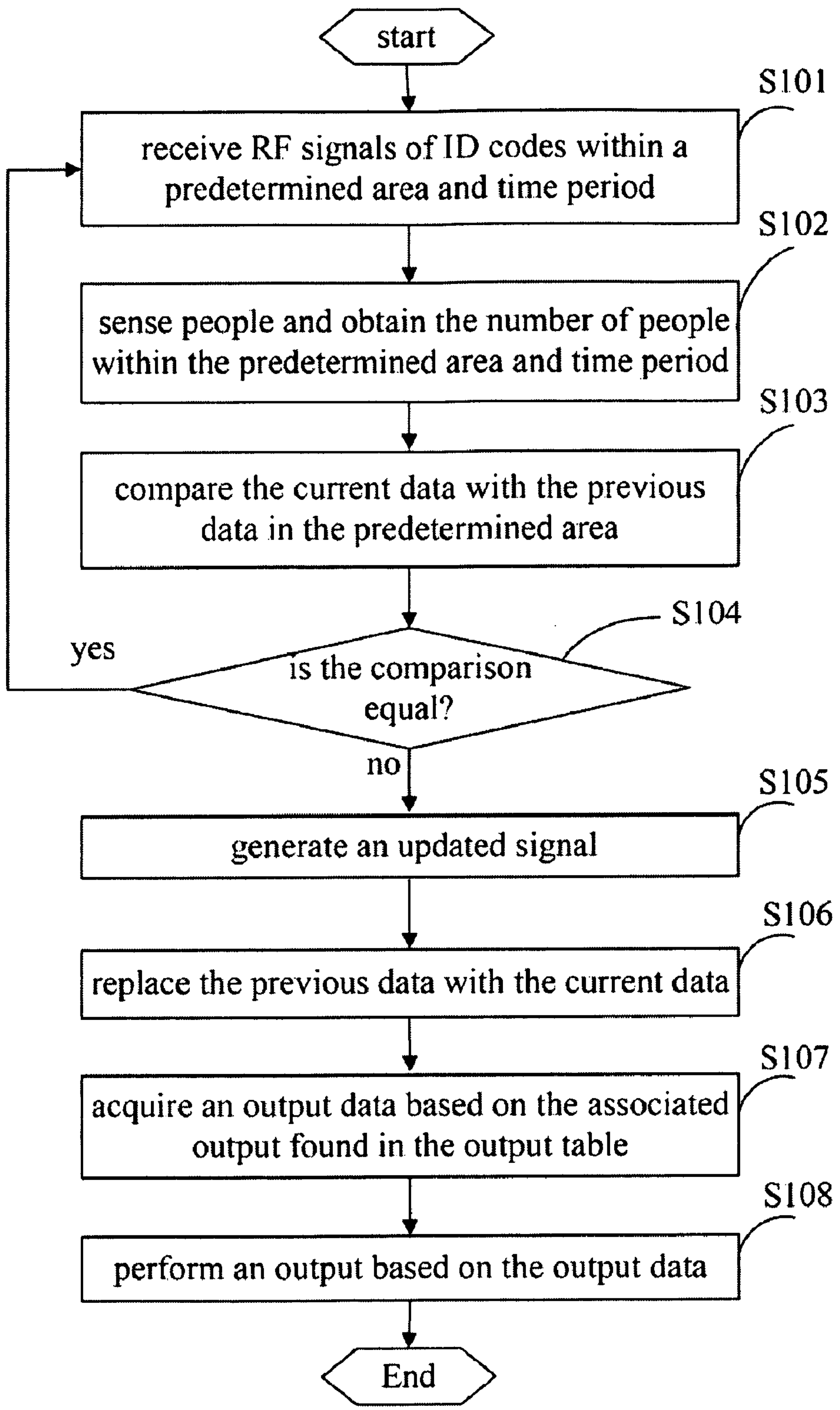
FIG. 5 is a flowchart of an output decision method implemented by the robot of FIG. 1.

FIG. 5 is a flowchart of an output decision method implemented by the robot 1. In step S101, the communicating unit 11 receives RF signals of ID codes from the RFID cards 8 within the predetermined area and time period and stores the data to the current data buffer 502. In step S102, the sensing unit 12 senses people and obtains the number of people within the predetermined area and time period and stores the data to the current data buffer 502. In step S103, the IDPD module 21 compares the current ID codes and the number of people with the previous data. In step S104, the IDPD module 21 judges whether the comparison is equal. If the comparison is equal, that is, the current data and the previous data are the same, the procedure returns to step S101.

If the comparison is not equal, that is, when the current data does not match the previous data, in step S105, the IDPD module 21 further generates the update signal to the updating module 23. In step S106, the updating module 23 replaces the previous data with the current data. In step S107, the output decision module 22 acquires the output data based on the associated output found in the output table 45. In step S108, the output unit 30 performs the output based on the output data.

It is understood that the output does not have to include all the three modules, i.e. the light decision module 222, the sound decision module 223 and the communication decision module 224; accordingly, the output unit 30 does not have to include all of the light module 32, the sound module 33 and the communication module 34. Furthermore, the action control module 31 does not have to include all of the head control module 311, the tail control module 312 and the limb control module 313.

In addition to being able to use the robot system to monitor changes in the composition of groups of people within a pre-determined area centered around the system, and perform actions associated with those changes, the system may be employed to monitor other kinds of changes as well. For example, used in a parking garage, the system could track vehicles and alert to the presence of unauthorized vehicles and warn people in the area of unauthorized vehicles or persons whose presence might mean an act of theft or assault is imminent.

It is understood that the invention may be embodied in other forms without departing from the spirit thereof. Thus, the present examples and embodiments are to be considered in all respects as illustrative and not restrictive, and the invention is not to be limited to the details given herein.

What is claimed is:

1. A robot system comprising:

a robot apparatus; and several wireless communication devices, for sending radio frequency (RF) signals of identification (ID) codes;

wherein the robot apparatus comprises:

a communicating unit, for receiving the RF signals of ID codes from the wireless communication devices within a predetermined area and time period;

a sensing unit, for sensing people and obtaining the number of people within the predetermined area and time period;

a buffer unit, for storing previous and current condition data, wherein the previous data, which is initialized to null, comprise ID codes and the number of people updated and stored at a previous time, and the current data comprise current ID codes and the number of people in the predetermined area as determined by the communicating unit and the sensing unit;

a storage unit, for storing an output table which respectively associates a plurality of outputs with various combinations and/or changes;

a processing unit comprising:

an ID presence determining (IDPD) module, for comparing the current ID codes and the number of people with previous data stored previously in the buffer unit, and generating an update signal when the comparison is not equal;

an updating module, for replacing the previous data with the current data based on the update signal; and an output decision module, for acquiring output data in the storage unit associated with any differences between previous data and current data in the output table; and an output unit, for performing an output according to the output data.

2. The robot system as recited in claim 1, wherein when the comparison is equal, the output unit does not perform any output.

3. The robot system as recited in claim 1, wherein the output unit comprising:

an action control module, for performing actions;

a light module, for emitting light;

a sound module, for outputting voice warning; and a communication module, for providing a communicative output.

4. The robot system as recited in claim 3, wherein the output decision module comprising:

an action decision module, for controlling the action control module to perform actions based on the associated output found in the output table;

a light decision module, for controlling the light module to emit light based on the associated output found in the output table;

a sound decision module, for controlling the sound module to output voice warning based on the associated output found in the output table; and a communication decision module for controlling the communication module to provide the communicative output based on the associated output found in the output table.

5. The robot system as recited in claim 3, wherein the robot apparatus further comprises one or more of the following members:

a movable head member;

a movable tail member; and a plurality of movable limbs;

and wherein the action control module comprises one or more of the following modules to control the corresponding members in the robot apparatus:

a head control module;

a tail control module; and a limb control module.

6. The robot system as recited in claim 1, wherein when the IDPD module determines different ID codes and different number of people by the communicating unit and the sensing unit within the predetermined area and time period, the output decision module acquires a first predetermined output data in the storage unit and the output unit performs a first output action.

7. The robot system as recited in claim 6, wherein the IDPD module determines same ID codes and different number of people by the communicating unit and the sensing unit within the predetermined area and time period, the output decision module acquires a second predetermined output data in the storage unit and the output unit performs a second output action which is different from the first output action.

8. An output control method adapted for a robot apparatus, wherein the robot apparatus includes a storage unit for storing an output table, which respectively associates a plurality of outputs with various combinations and/or changes, and a buffer unit for storing previous and current condition data, wherein the previous data is initialized to null, and the current data comprises current identification (ID) codes and the number of people, the output control method comprising:

receiving radio frequency (RF) signals of the ID codes from several wireless communication devices within a predetermined area and time period;

sensing people and obtaining the number of people within the predetermined area and time period;

comparing the current the ID codes and the number of people in the predetermined area with the previous data;

generating an update signal when the comparison is not equal;

replacing the previous data with the current data based on the update signal;

acquiring output data associated with any differences between previous data and current data in the output table; and performing an output based on the output data.

9. The output control method as recited in claim 8, further comprising not performing any output, when the comparison is equal.

10. The output control method as recited in claim 8, further comprising:

acquiring a first predetermined output data in the storage unit and performing a first output action if different ID codes and different number of people within the predetermined area and time period are determined.

11. The output control method as recited in claim 10, further comprising:

acquiring a second predetermined output data in the storage unit and performing a second output action which is different from the first output action if same ID codes and different number of people within the predetermined area and time period are determined.

12. A robot apparatus comprising:

a communicating unit, for receiving radio frequency (RF) signals of identification (ID) codes from several wireless communication devices within a predetermined area and time period;

a sensing unit, for sensing people and obtaining the number of people within the predetermined area and time period;

a buffer unit, for storing previous and current condition data, wherein the previous data, which is initialized to null, comprise ID codes and the number of people updated and stored at a previous time, and the current data comprise ID codes and the number of people in the predetermined area as determined by the communicating unit and the sensing unit;

a storage unit, for storing an output table which respectively associates a plurality of outputs with various combinations and/or changes;

a processing unit comprising:

an ID presence determining (IDPD) module, for comparing the current ID codes and the number of people with previous data stored previously in the buffer unit, and generating an update signal when the comparison is not equal;

an updating module, for replacing the previous data with the current data based on the update signal; and an output decision module, for acquiring output data in the storage unit associated with any differences between previous data and current data in the output table; and an output unit, for performing an output according to the output data.

13. The robot apparatus as recited in claim 12, wherein when the comparison is equal, the output unit does not perform any output.

14. The robot apparatus as recited in claim 12, wherein the output unit comprising:

an action control module, for performing actions;

a light module, for emitting light;

a sound module, for outputting voice warning; and a communication module, for providing a communicative output.

15. The robot apparatus as recited in claim 14, wherein the output decision module further comprising:

an action decision module, for controlling the action control module to perform actions based on the associated output found in the output table;

a light decision module, for controlling the light module to emit light based on the associated output found in the output table;

a sound decision module, for controlling the sound module to output voice warning based on the associated output found in the output table; and a communication decision module for controlling the communication module to provide the communicative output based on the associated output found in the output table.

16. The robot apparatus as recited in claim 14, wherein the robot apparatus further comprises one or more of the following members:

a movable head member;

a movable tail member; and a plurality of movable limbs;

and wherein the action control module comprises one or more of the following modules to control the corresponding members in the robot apparatus:

a head control module;

a tail control module; and a limb control module.

17. The robot apparatus as recited in claim 12, wherein when the IDPD module determines different ID codes and different number of people by the communicating unit and the sensing unit within the predetermined area and time period, the output decision module acquires a first predetermined output data in the storage unit and the output unit performs a first output action.

18. The robot apparatus as recited in claim 17, wherein the IDPD module determines same ID codes and different number of people by the communicating unit and the sensing unit within the predetermined area and time period, the output decision module acquires a second predetermined output data in the storage unit and the output unit performs a second output action which is different from the first output action.

* * * * *